Nov. 14, 1944.   J. H. MACARTNEY ET AL   2,362,705
PRIME MOVER DEVICE
Filed Sept. 9, 1939   6 Sheets-Sheet 1

John H. Macartney
Robert S. Stark
INVENTORS.

BY George B. White
ATTORNEYS.

Nov. 14, 1944.  J. H. MACARTNEY ET AL  2,362,705
PRIME MOVER DEVICE
Filed Sept. 9, 1939  6 Sheets-Sheet 2

John H. Macartney
Robert S. Stark
INVENTORS

BY George B. White
ATTORNEYS.

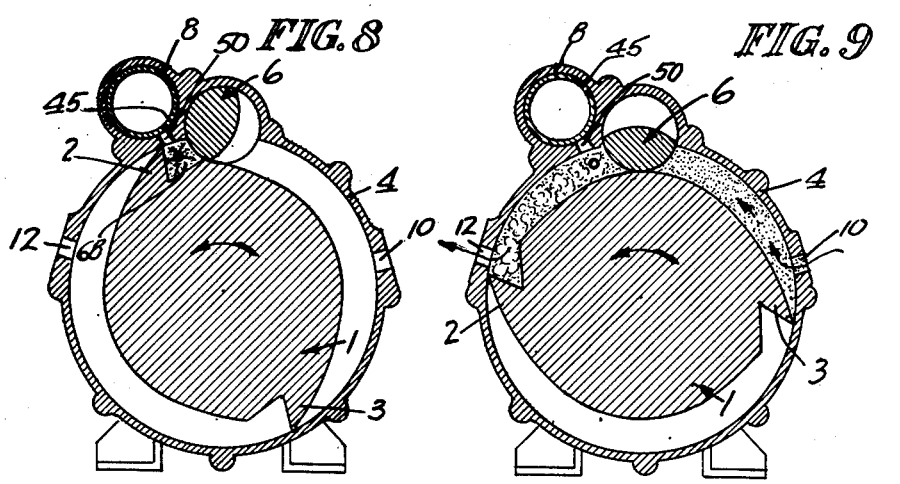
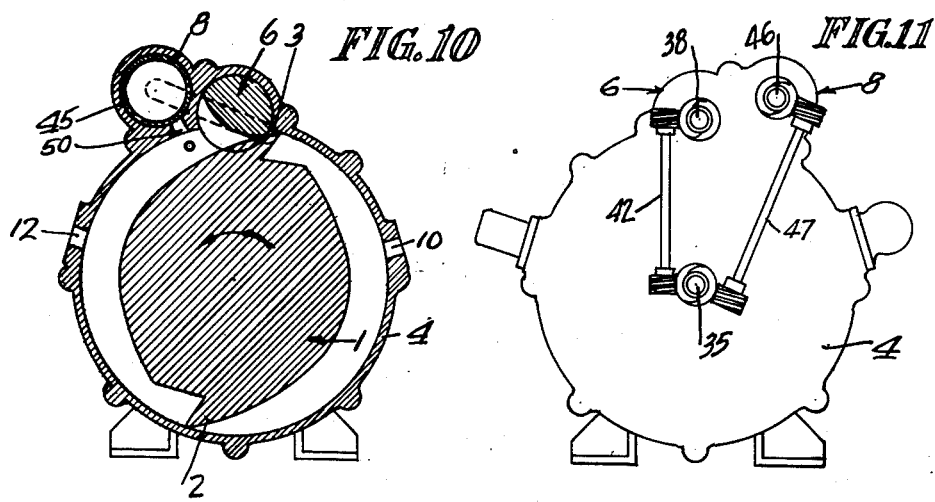

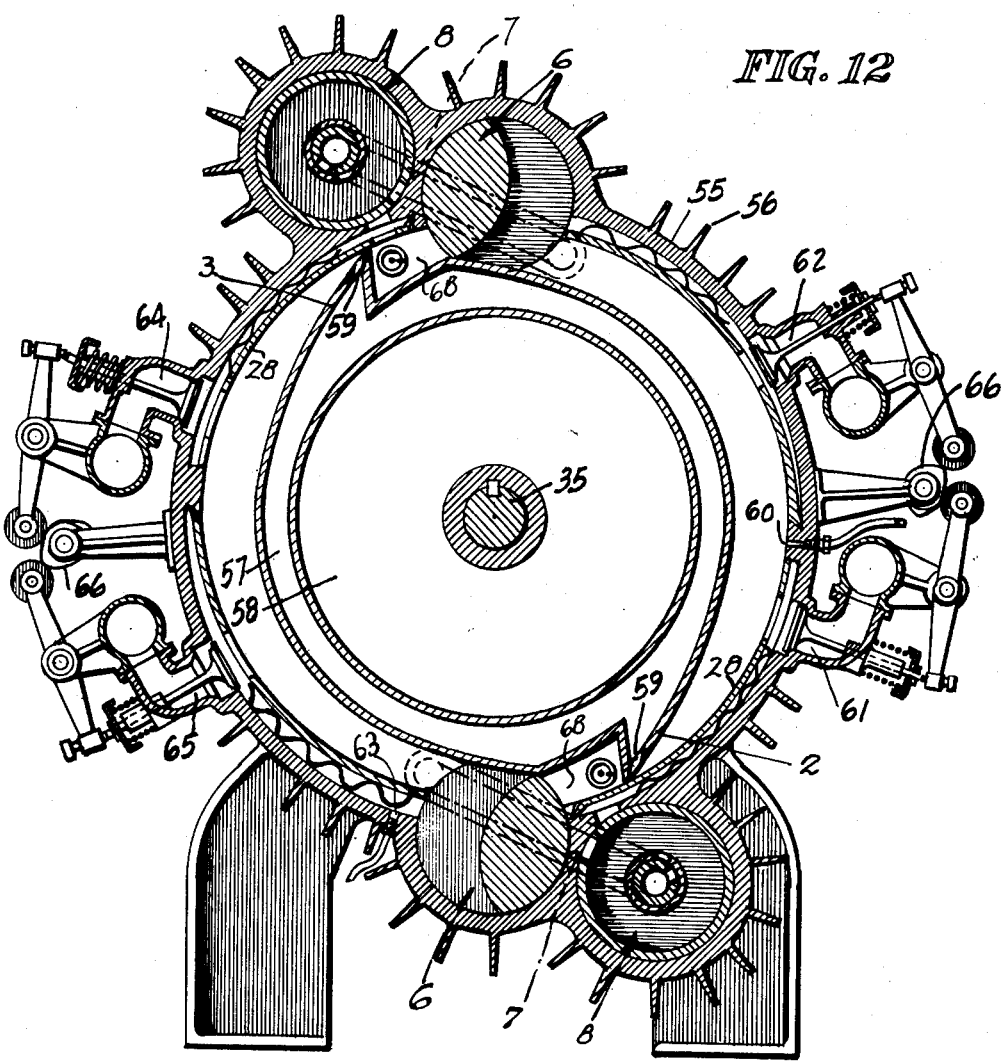

Nov. 14, 1944.    J. H. MACARTNEY ET AL    2,362,705
PRIME MOVER DEVICE
Filed Sept. 9, 1939    6 Sheets-Sheet 5
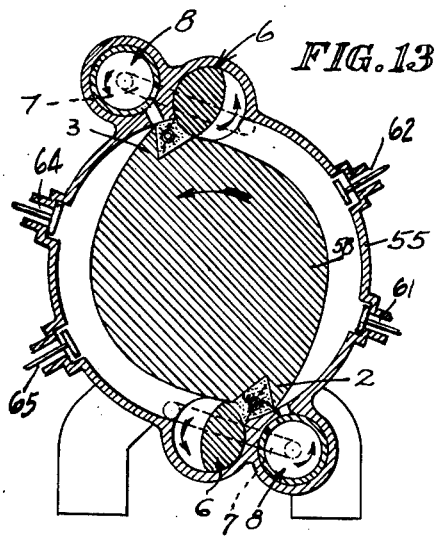
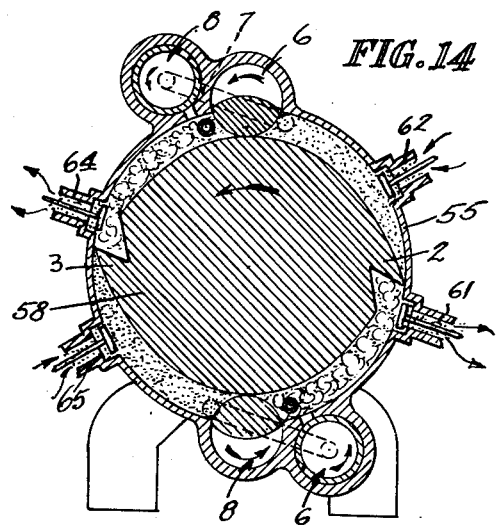
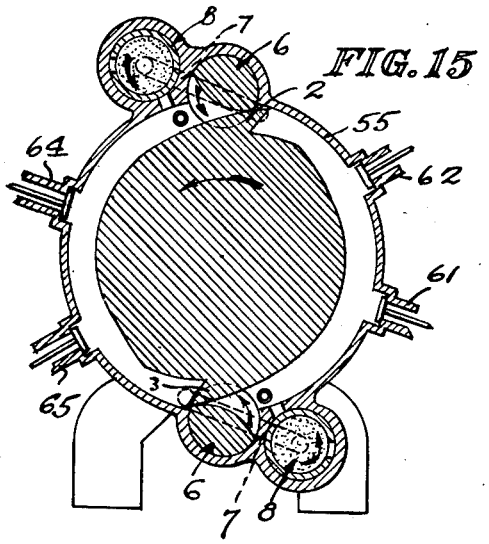
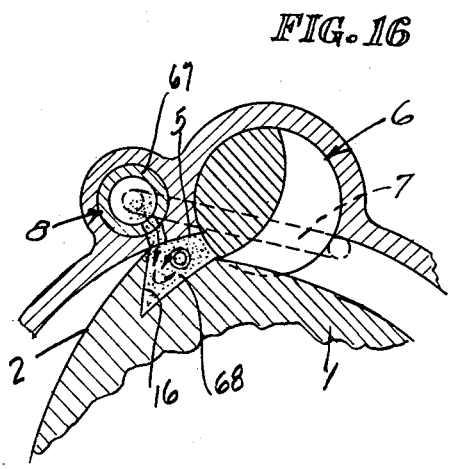
John H. Macartney
Robert S. Stark
INVENTORS
BY George B. White
ATTORNEYS.

Nov. 14, 1944.  J. H. MACARTNEY ET AL  2,362,705
PRIME MOVER DEVICE
Filed Sept. 9, 1939   6 Sheets-Sheet 6
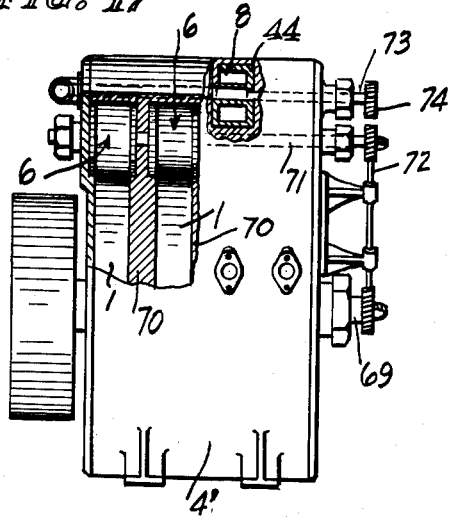
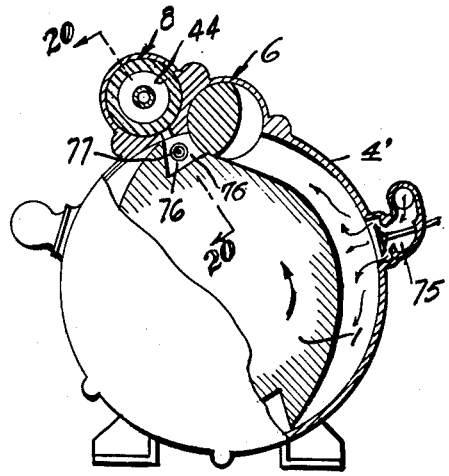
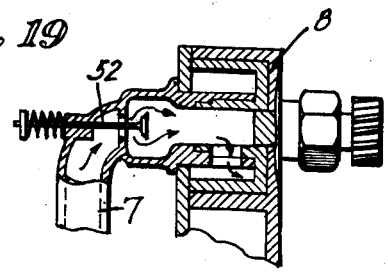
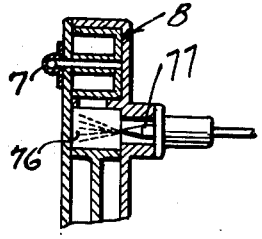
John H. Macartney
Robert S. Stark
INVENTORS
BY George B. White
ATTORNEY.

Patented Nov. 14, 1944

2,362,705

UNITED STATES PATENT OFFICE 2,362,705

PRIME MOVER DEVICE

John H. Macartney and Robert S. Stark, San Francisco, Calif., assignors of twenty per cent to I. Ruderman, San Francisco, Calif.

Application September 9, 1939, Serial No. 294,066

5 Claims. (Cl. 123—13)

This invention relates to a rotary prime mover device.

An object of this invention is to provide a device wherein the power is created by compressing air or fuel mixture by a rotor, accumulating the compressed air or mixture in a separate chamber, and introducing the accumulated compressed air or mixture into a combustion chamber so that the force of expansion of burning or of the explosion of the fuel mixture will impart a rotating force to the same rotor.

Another object of this invention is to provide a device wherein air or gaseous mixture compressed by the peripheral action of a rotating element is accumulated in a separate chamber with rotary walls, and wherein the predetermined reintroduction of the accumulated pressure medium to the periphery of the same rotating element and its combustion thereat is utilized to rotate said rotating element.

Another object of this invention is to provide a prime mover wherein a rotor compresses air or fuel mixture which is accumulated in a valve chamber and reintroduced to said rotor at a point where it imparts a force for rotating said rotor, means being provided to constantly direct and hold the pressure at selected points of the rotor periphery.

Another object of this invention is to provide an engine wherein the periphery of power receiving projections of a rotor coacts with a casing to compress air or fuel mixture on a predetermined section of the casing periphery, to accumulate the compressed medium in a separate valve chamber, and to reintroduce the compressed medium at another section of the casing back to the rotor periphery in such a manner as to utilize the burning or explosion of said medium at the point of its reintroduction to impart power for the rotation of said rotor; means in constant contact with rotor periphery prevent escape of said medium from one section of said casing periphery to another except as predetermined by said valve chamber.

Another object of this invention is to provide an engine wherein a rotor has surfaces convergent to the inner periphery of the cylinder around the rotor, and wherein a rotary separator element in the casing separates a compression section of said casing periphery from a combustion section of said casing periphery, said separator element being in contact with the periphery of the rotor during all times that pressure is present at said elements.

Another object of this invention is to provide an accumulator chamber and valve arrangement for engines so connected to the piston of the engine as to accumulate the pressure created during the compression strokes or movements of the piston and to release the accumulated compressed medium into the path of the piston at a predetermined section of its movement or stroke for combustion and for the creation of motive power on said piston.

Another object of this invention is to provide a rotary engine wherein the medium compressed during one or more revolutions of the rotor of said engine is accumulated in a valve chamber, and is reintroduced at a predetermined time and point to the same rotor for the creation of the motive power on said rotor; the medium may be air only as it would be advantageous on Diesel type operation where the fuel in injected at the point of reintroduction of the compressed air to the rotor periphery, or the medium may be the usual combustible fuel mixture to be ignited at the point of reintroduction to the rotor periphery.

Another object of this invention is to provide a packing for a rotary engine which is in constant yieldable contact with the projecting pressure points of the rotor periphery, and a novel packing for the sides of the rotor.

Another object of this invention is to provide a novel manner of cooling a rotary engine.

Other objects of the invention together with the foregoing will be set forth in the following description of the preferred method and the preferred embodiments of means for practicing the same, which are illustrated in the drawings forming part of the specification. It is to be understood that we do not limit ourselves to the embodiments disclosed in said description and drawings as we may adopt variations of our preferred forms within the scope of our invention.

The invention is clearly illustrated in the accompanying drawings, wherein

Fig. 8 is a somewhat diagrammatic sectional view showing the engine at about the beginning of its power stroke.

Fig. 9 is a somewhat diagrammatic view showing the engine at about the end of the power and at about the beginning of the exhaust and of the compression stroke on the opposite sides of the abutment.

Fig. 10 is a somewhat diagrammatic view showing the engine at the end of a compression stroke.

Fig. 11 is a rear view of the engine showing the timing transmission between the drive shaft and the rotary check and the rotary compression valve.

Fig. 12 is a sectional view of a modified form of our engine with multiple power stroke on the same rotor.

Fig. 13 is a diagrammatic view showing the double action engine at about the beginning of the power stroke.

Fig. 14 is a somewhat diagrammatic view showing the double action engine at the beginning of the exhaust strokes.

Fig. 15 is a diagrammatic view showing the double action engine at the ends of the respective compression strokes.

Fig. 16 is a fragmental sectional view of a form of the valve unit wherein the compression valve chamber is smaller than the volume of the combustion or burning chamber.

Fig. 17 is a side view partly in section of a multistage engine constructed in accordance with our invention.

Fig. 18 is an end view partly in section of an engine illustrating operation on the Diesel principle.

Fig. 19 is a fragmental sectional view of the connection between the travel tube and the accumulator valve showing the check valve in the passage.

Fig. 20 is a fragmental sectional view of the portion of the engine adjacent the combustion space showing the fuel injector, the section being taken on the lines 20—20 of Fig. 18.

Figure 1:
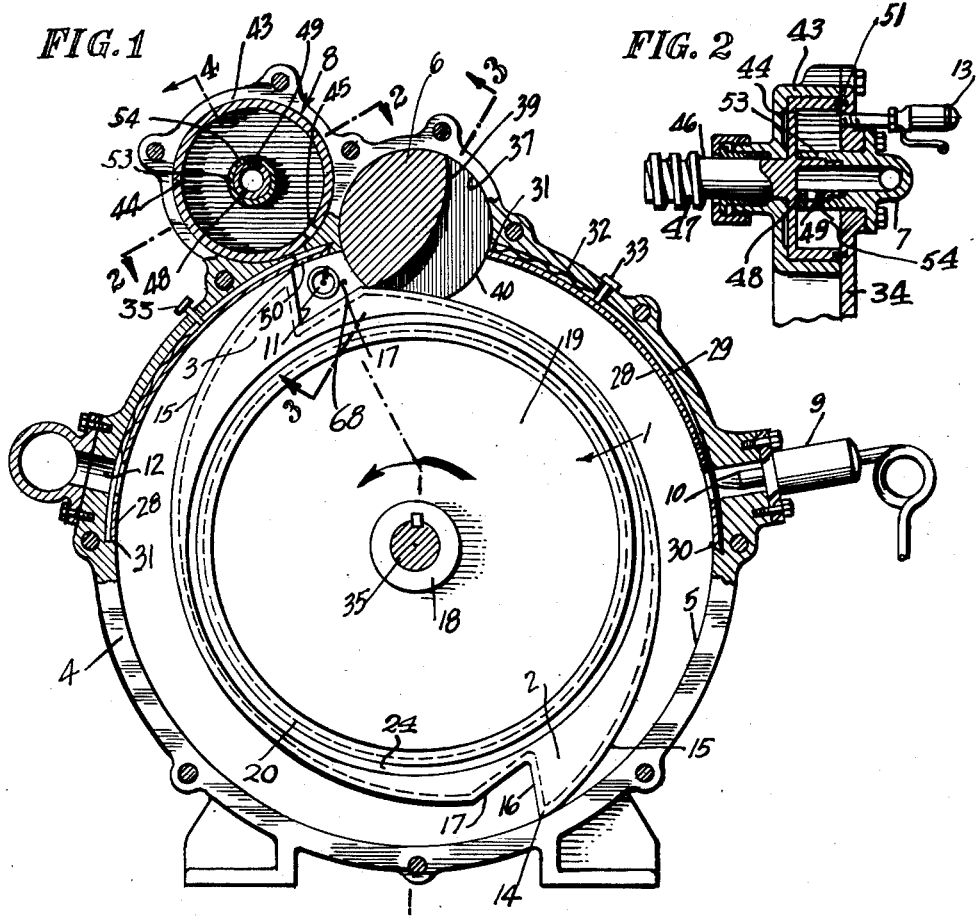
Fig. 1 is a sectional view of a rotary engine constructed in accordance with our invention, the section being taken on the lines 1—1 of Fig. 4.
Figure 2:
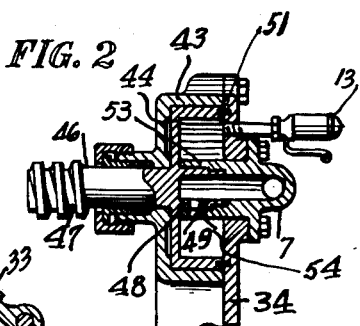
Fig. 2 is a sectional detail view of the compression valve chamber of our invention, the section being taken on the lines 2—2 of Fig. 1.
Figure 3:
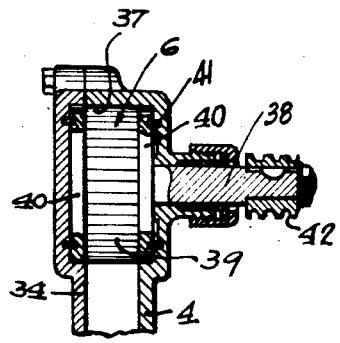
Fig. 3 is a sectional view of the arrangement of the abutment or rotary check in the casing, the section being taken on the lines 3—3 of Fig. 1.
Figure 4:
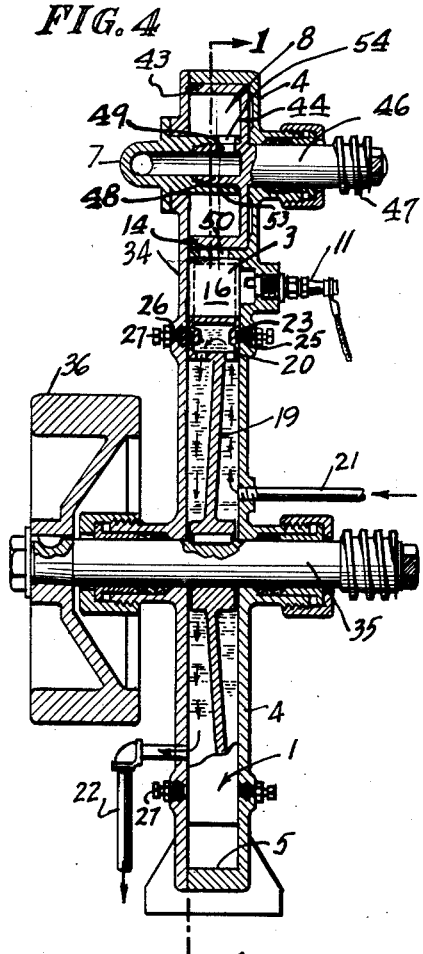
Fig. 4 is a cross-sectional view of the engine, the section being taken on the lines 4—4 of Fig. 1.
Figure 5:
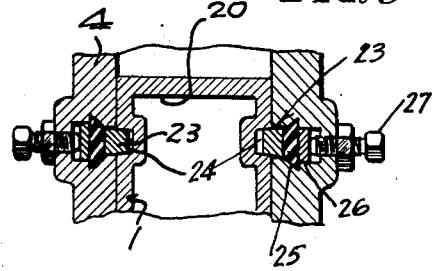
Fig. 5 is a fragmental sectional view, showing the side packing between the rotor and the casing.
Figure 6:
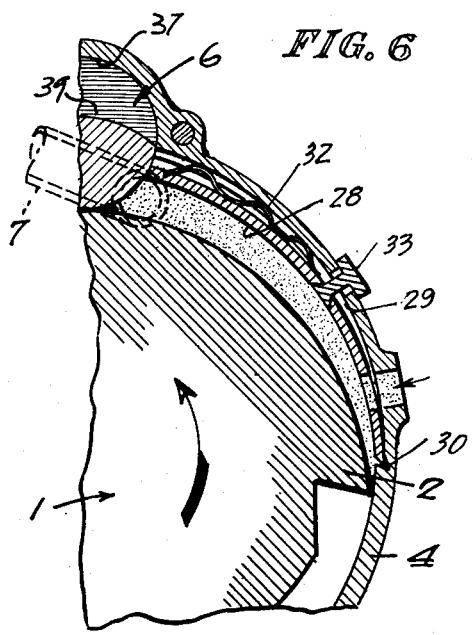
Fig. 6 is a fragmental sectional view showing the peripheral seal where the compression and intake take place.
Figure 7:
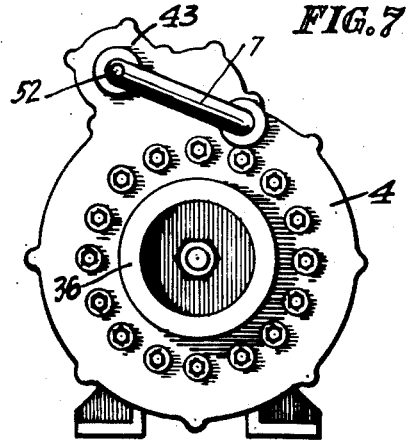
Fig. 7 is a face view of the engine.

In carrying out our invention in the illustrated embodiments shown in Figures 1 to 7 inclusive we make use of a rotor 1 having peripheral driving and compressing projections 2 and 3 surrounded by a circular casing 4. The points of the projections 2 and 3 ride on the inner periphery 5 of the casing 4. An abutment or check 6 in the casing 4 is in constant contact with the periphery of the rotor 1 and transversely divides the space between the periphery of the rotor 1 and the casing periphery 5. A transfer tube 7 conducts the mixture or air from one side of the check 6 to an accumulator valve mechanism 8 which latter discharges the compressed medium to the periphery of the rotor 1 at the other side of the check 6. The casing 4 has on it suitable intake and exhaust ports in accordance with the principle of introduction and burning of the fuel for creating power. For instance internal combustion by ignition is accomplished when an atomizer or injector 9 functioning somewhat like the usual carburetor, suitably injects if necessary under pressure the combustible mixture through the inlet 10, which after compression and reintroduction through the valve mechanism 8 is ignited by a spark plug 11 adjacent to the other side of the check 6. The combusted gases are subsequently suitably exhausted through an exhaust port 12 at about the point of the casing periphery 5 where the projection points 2 or 3 may be located at the ends of their respective power strokes. A suitable suction conduit may be provided to suck the exhaust gases out through said exhaust port in any usual manner known in the prior art. In the event the so called Diesel principle of combustion is employed, then air would be introduced through the intake port 10, and in place of the spark plug 11 a fuel injector would be provided to inject fuel into the compressed air in the combustion space adjacent the check 6. The accumulator and valve mechanism 8 is provided with a suitable safety valve 13 to relieve excess pressure above a desirable compression.

The rotor 1 rotates in a contra-clockwise direction viewing Fig. 1. Each of its projections 2 or 3 has a leading side with a cam-like curvature extending from a tip 14 substantially tangentially to the rotor 1 so as to form an inclined impeller face 15, which incloses with the casing periphery 5 a space which decreases toward the projection tip 14 oppositely to the direction of rotation of the rotor 1. This impeller face 15 of each projection 2 or 3 drives the gaseous medium before it. The trailing face of each projection 2 or 3 extends abruptly from the tip 14 so as to include an acute angle with the leading face 15 thereby to form an impact or power face 16 which receives the impact of the expansive force of the gases of combustion preferably at an angle slightly offset toward the center and toward the direction of rotation with respect to a radial plane drawn from the projection tip 14. There is an indent face 17 formed at the root of the power face 16 so as to provide a suitable pocket for receiving the force of combustion.

Structurally the rotor 1 in the herein illustrative embodiment includes a hub 18, a dished disc portion 19, and a hollow rim 20 which latter is formed in the shape of the projections 2 and 3 as heretofore described. This structure can be used for internal water cooling and also to add flywheel effect. The inner periphery of the rotor rim 20 has holes therethrough. Water under pressure is conducted to one side of the disc portion 19 through an inlet conduit 21. The centrifugal force together with the water pressure urges the water out into the rim 20 and over to the opposite side of the disc 19 and out at the outlet conduit 22 on the other side of the casing 4.

The packing of the sides of the rotor is accomplished by opposite packing rings 23 fitting into annular grooves 24 in the opposite sides of the rotor rim 20. The packing rings 23 are located in annular recesses in the inner side of the casing 4 and are backed by compressible packing 25, on the outside of which latter are holding plates 26 engaged by set screws 27 for holding the packing rings 23 in place under slightly yieldable pressure. This prevents any seepage or leakage from the outside of the rotor rim 20 to the space adjacent the disc portion 19 or vice versa.

The casing 4 is also provided with spring pressed sectional linings 28 to form peripheral seals in the portion of the inner casing periphery 5 between the inlet 10 and the check 6 and in the portion between the check 6 and the exhaust port 12. Each lining 28 is a spring plate fitted into a recessed portion 29 of the casing periphery 5 so as to be contiguous with the casing periphery 5 at the point 30 where it is first engaged by the projectors 2 or 3. The other end 31 of the lining 28 is free to move away from the casing periphery 5. A pin 33 slidable through the wall of the casing 4 adjustably holds the lining 28. A spring band 32 is in the recessed portion 29 so as to resiliently urge the lining 28 toward the rotor 1. In this manner leakage at the compression and power stroke portions of the casing 4 is obviated. It is to be noted that the side 34 of the casing 4 is removable for the purpose of assembly.

A drive shaft 35 is suitably journaled in the casing 4 and is keyed into the rotor hub 18. The journals of the shaft 35 are suitably packed. On the shaft is a combination pulley and wheel 36 or other suitable connection for the transmission of power therefrom.

The abutment or check 6 is so formed and supported that it is in contact with the outer periphery of the rotor 1 at all times. The check 6 is held in a cylindrical socket 37 the axis of which is parallel with the axis of rotation of the rotor 1. A stub shaft 38 extends from one face of the check 6 so as to be coaxial with the cylindrical socket 37. The outer surface of the check 6 is shaped out of a cylindrical body concentric with the socket 37 by cutting away the cylindrical body on an arc terminating at the ends of a diameter so that the arc is convex over the axis of the check 6. This convex check face 39 is of such curvature as to roll over the inclined leading or impeller faces 15 of the rotor projections 2 and 3. The proportions of the check periphery are such that there is a contact with the rotor periphery in every relative position of the check 6 and the rotor 1. End flanges 40 are full circle flanges and act as bearings for the check 6. In the outside surfaces of the end flanges 40 and in the adjacent sides of the socket 37 are registering circular grooves into which are held suitable packings 41. In the form shown in Fig. 1 and in the diagrams in Figures 8, 9, and 10, the check 6 is rotated positively in the same direction as the rotor by means of a worm and gear timing transmission 42 between the drive shaft 35 and the stub shaft 38, as shown in Fig. 11.

The accumulator and valve mechanism 8 includes a cylindrical valve housing 43 which has in it a rotating valve cup 44 with a valve opening 45 through the side of the latter. A valve shaft 46 extends from the cup 44 and is suitably journaled and packed in the wall of the valve housing 43. Suitable worm and gear timing transmission 47 transmits movement from the drive shaft 35 to the valve shaft 46, as shown in Fig. 11. A central hollow intake sleeve 48 extends inwardly from the bottom of the valve cup 44 and rotatably interlocks with the end of the transfer tube 7 so as to conduct the gaseous medium therefrom. On the side of the intake sleeve 48 is a slot 49 through which the gaseous medium is passed into the valve cup 44. The transmission 47 is so geared that the valve 45, twice during every revolution of the rotor 1, is in registry with an intake port 50 in the side of the valve housing 43 leading into the combustion space in the casing 4. The timing is so synchronized that whenever the trailing face 16 of one of the projections 2 or 3 is approaching the position for the power stroke past the check 6, then the valve opening 45 registers with the intake port 50 and the compressed medium is introduced from the valve cup 44 into the space between the projection 2 or 3 and the check 6 thereat. In the event of multiple compression the gearing of the transmission 47 is such that the valve cup 44 is rotated one revolution to two or more revolutions of the rotor 1. The open end of the valve cup 44 is suitably packed at 51 against the adjacent wall of the valve housing 43.

A check valve 52 in the transfer tube 7, as shown in Fig. 19, prevents the return of the compressed medium from the valve cup 44 into the intake side of the casing 4. Checking any back flow into transfer tube 7 can be also accomplished by a fixed sleeve 53 around the central valve sleeve 48 so slotted at 54 as to uncover the sleeve opening 49 during the intake stroke of the projection 2 or 3 and to cover the sleeve opening 49 other times. Inasmuch as the sleeve 48 is rotated with the valve cup 44 by the transmission 47 in synchronism with the rotation of the rotor 1, the timing of the covering and uncovering of the sleeve opening 49 can be accurately predetermined.

In operation of the embodiment shown in Figures 1 to 11, when the principle of ignition is employed, the leading impeller face 15 of the rotor projection 2 forces the mixture from the intake 10 out through the transfer tube 7 and through the sleeve opening 49 into the rotary valve cup 44. This is because the check 6 prevents the passage of the mixture along the rotor periphery. At a suitable advance before the projection 2 reaches the position shown in Fig. 8 the valve opening 45 is in registry with the intake port 50 and the accumulated, compressed mixture is introduced under pressure to the other side of the check 6 against the trailing power face 16 of the projection 2. By means of the usual timer, not shown, the ignition spark is created at the spark plug 11 and the resultant combustion exerts its power against the trailing power face 16 of the projection 2. On further rotation the valve cup 44 is turned so as to cover the valve opening 45, and the projection 2 reaches the exhaust port 12, and at the same time the other projection 3 reaches the intake 10 as shown in Fig. 9, and the same cycle is repeated by the other projection 3 of the rotor 1 as heretofore described. Fig. 10 illustrates the position of the projection 3 at about the end of the compression stroke just before it passes from the compression side of the check 6 to the combustion chamber side of the check 6, for the next power stroke.

The embodiment shown in Figures 12, 13, 14 and 15 is a double action rotary engine operating on the same principle as the first embodiment heretofore described, except that two sets of checks and accumulator valves are provided at diametrically opposite points so as to act simultaneously on the projections 2 and 3 respectively. The casing 55 is provided with air cooling fins 56 at the areas of compression and combustion. The hollow head or rim 57 of the rotor 58 is perforated outwardly at 59 near the tips of the projections 2 and 3. The casing has an oil inlet 60 between the exhaust valve 61 and the intake valve 62 along the upward path of the projections 2 or 3, viewing Fig. 12. An oil outlet 63 leads from the casing 55, see Fig. 12. The oil for lubrication and cooling the rim 57 enters through the inlet 60, meets the aperture or perforation 59 in the approaching projection 2, and flows into said aperture 59. The oil in the rim 57 is distributed by centrifugal force and forms a film on the inside of the rim 57. The oil splashes out on the downward stroke of the projection 3 as shown in Fig. 12 and it flows out through the outlet 63. The openings 59 are very minute, and due to the speed of rotation of the rotor and the centrifugal pressure of the oil film inside the rotor, any loss of compression through said openings 59 is negligible. This double action rotary engine may be also lubricated in other suitable manner.

The exhaust and intake openings are controlled by the respective valves which are opened and closed by cams 66 suitably controlled from the drive shaft 35 of the rotor 58. The combustion against both projections 2 and 3 is preferably simultaneous. In operation, as shown in Fig. 13, combustion occurs at both projections, at which time both intake valves 62 and 65 are open and the exhaust valves 61 and 64 are closed. As the power stroke reaches its end and the exhaust stroke begins, as shown in Fig. 14, the exhaust valves 61 and 64 are also open. At the completion of the compression strokes, as shown in Fig. 15, all the valves are closed. In all other respects the modified embodiment involves the same principles as the first described single action form.

For higher compressions, especially when the engine is used on a Diesel principle, the accumulator chamber in the valve is made smaller. This is illustrated in Fig. 16 herein. The space within the valve cup 67 herein is smaller than the space within the initial combustion chamber 68 formed between the check 6, the power face 16 of the rotor projection 2 and the adjacent portion of the casing periphery 5. The space within said combustion chamber 68 is also smaller in proportion to the intake space before the leading impeller face 15 from the intake to the check 6 than the proportion in the types of the rotary engine where ignition is utilized. In this manner the highly compressed mixture is quickly liberated into a compression chamber and is held there at a higher relative pressure than in the usual ignition type system previously described. In this manner a fuller and more highly compressed mixture or medium can be released into the initial combustion chamber 68 and the mixture is totally released into said combustion chamber 68.

The multiple unit engine shown in Figure 17 illustrates the embodiment of our invention where a plurality of rotors 1 are mounted on a shaft 69 common to all and journaled in an outer casing 4'. The units are separated by partition walls 70. Each unit includes the elements of the rotary engine heretofore described and operates on the same principle. The rotary checks 6 are suitably mounted on a single shaft 71 extended through all the units of the engine and driven by the timing connection 72. The rotary valve cups 44 of the accumulator valves 8 are mounted with suitable adjustment on the shaft 73 driven from the drive shaft 69 by a timing connection and transmission 74. Each unit has its own accumulator valve mechanism 8. It is to be noted that in this multiple unit the gear ratio of the transmission 74 is such that the valve shaft 73 rotates once for several revolutions of the drive shaft 69, thus providing for the building up of multiple precompression for each combustion. The rotors 1 are offset relatively to each other to position their projections 2 and 3, in a predetermined offset order and the valve cups 44 are also so offset relatively to each other as to release the precompressed medium to the respective stages in the desired overlapping firing order.

The offset multiple operation of the units of this multiple unit engine allows higher pre-compression of the medium for combustion, and particularly adapts this type of engine for operation on the Diesel principle. In operation on the Diesel principle, as illustrated in Figure 18, the intake is a valve operated air intake 75, the air is compressed into the valve cup 44 and released into the initial combustion space 76 in the manner heretofore described. In the combustion space 76 is a fuel injector 77 through which the fuel is injected into the compressed air substantially simultaneously with the introduction of the discharge of said compressed air from the accumulator valve 8.

Having thus described our invention what we now claim and desire to secure by Letters Patent is:

1. In a rotary engine of the character described the combination with a rotor in a casing having an intake and exhaust, of elements extended from the rotor periphery to the casing periphery, leading side of each of said elements forming an impeller face, the trailing side of each of said elements forming a power receiving face, a rotary element in constant contact with the rotor periphery between the intake and exhaust obstructing communication between the spaces on the opposite sides of said rotary element, a receptacle on the casing communicating with the intake side of said rotary obstructing element so as to accumulate the medium compressed by the impeller face of said elements, and a rotary sleeve valve in said receptacle separate from said rotary element to reintroduce the accumulated, compressed medium from said receptacle to the other side of said obstruction element for combustion in synchronism with the rotation of said rotor, said obstructing element acting as a constant wall for compression on its side toward the intake and for combustion on its other side.

2. In an engine, a precompressing mechanism, comprising, a movable power receiving element, a diverter in the path of the medium compressed by the movable power-receiving element, an accumulator member to receive and accumulate the compressed medium, a wall of said accumulator being rotatable, a hollow sleeve axial to said rotatable wall and rotating therewith, said sleeve having an opening forming the intake to the accumulator member, means to conduct the diverted medium to said axial sleeve, a stationary sleeve around the axial sleeve having a port therethrough, an inlet to the combustion chamber, an accumulator outlet on said rotary wall, and means to so rotate said rotary wall that its outlet registers with the combustion chamber inlet only at the combustion stroke of the engine, the relative positions of said sleeve intake opening, said stationary sleeve port, and said accumulator outlet being such that said intake opening is in registry with said stationary sleeve opening only during the compression strokes of the engine.

3. The combination with a rotary engine, including a rotor in a casing, and projections extended from the rotor periphery to alternately compress a medium for combustion and receive the pressure of combustion of the same medium; of means to obstruct the passage of said medium along the rotor periphery at a portion of said casing, an air intake to introduce air in the path of said projections in advance of said obstruction means, an accumulator mechanism to accumulate the air compressed by said projections against said obstruction means including a chamber, means in said chamber rotating relative to said compression chamber and operating in synchronism with the rotor but independently of said obstructing means to confine the air for a predetermined precompression and to introduce the accumulated compressed air on the other side of said obstruction means when the rotor projections are in power receiving position, and means to inject fuel into the reintroduced compressed medium at said obstruction means.

4. The combination with a rotary engine, including a rotor in a casing, and projections extended from the rotor periphery to alternately compress a medium for combustion and receive the pressure of combustion of the same medium; of means to obstruct the passage of said medium along the rotor periphery at a portion of said casing, an air intake to introduce air in the path of said projections in advance of said obstruction means, an accumulator mechanism to accumulate the air compressed by said projections against said obstruction means including a chamber, means rotating in and relatively to said chamber and synchronized with the rotor to release the medium accumulated during predetermined revolutions of said rotor and to reintroduce the accumulated compressed air to the rotor when a projection is in pressure receiving position at the other side of the obstructing means, and means to inject fuel into the reintroduced compressed air.

5. In an engine, in combination, a casing, a plurality of coaxial rotors rotated in said casing, peripheral projections on said rotors to compress a medium for combustion and receive the pressure of combustion, the projections on the different rotors being in a predetermined angularly offset relation relatively to each other, separating walls in the casing between the rotors, an accumulating mechanism for each rotor to accumulate the medium compressed by said rotor, said accumulating mechanisms including aligned compression chambers arranged in series alongside the casing, and means rotatable in and relatively to each of said chambers, to reintroduce the compressed medium from each accumulator to the respective rotors for combustion against the respective projections said last means offset angularly relatively to each other in the same relation as the offset relation of the projections of the respective rotors, and means to rotate said reintroducing means in synchronism with the rotation of said rotors.

JOHN H. MACARTNEY.
ROBERT S. STARK.